United States Patent [19]

Karlsson

[11] Patent Number: 5,349,458
[45] Date of Patent: Sep. 20, 1994

[54] METHOD FOR DETECTING EXTERNAL INFLUENCE ON AN OPTICAL CABLE

[76] Inventor: Stefan U. Karlsson, Rönnbärsgatan 2, S-590 50 Vikingstad, Sweden

[21] Appl. No.: 752,575
[22] PCT Filed: Mar. 9, 1989
[86] PCT No.: PCT/SE89/00116
§ 371 Date: Sep. 9, 1991
§ 102(e) Date: Sep. 9, 1991
[87] PCT Pub. No.: WO90/10921
PCT Pub. Date: Sep. 20, 1990
[51] Int. Cl.⁵ .................... H04B 10/08; H04J 14/02
[52] U.S. Cl. .................... 359/124; 359/110; 359/112; 359/173; 340/555; 340/556; 250/227.14; 385/12; 385/100
[58] Field of Search ............ 359/110, 115, 116, 156, 359/173, 177, 112, 124; 250/227.14, 227.17, 227.27; 340/555, 556; 385/12, 100, 147; 379/7

[56] References Cited

U.S. PATENT DOCUMENTS

| | | | |
|---|---|---|---|
| 4,292,628 | 9/1981 | Sadler | 340/555 |
| 4,297,684 | 10/1981 | Butter | 340/557 |
| 4,480,916 | 11/1984 | Bareket et al. | 356/351 |
| 4,495,411 | 1/1985 | Rashleigh | 250/227 |
| 4,525,626 | 6/1985 | Kush et al. | 250/227 |
| 4,583,855 | 4/1986 | Bareket | 356/351 |
| 4,591,709 | 3/1986 | Koechner et al. | 340/555 |
| 4,633,235 | 12/1986 | DeGennaro | 340/555 |
| 4,636,029 | 1/1987 | Johansson et al. | 340/555 |
| 4,653,915 | 3/1987 | Frigo et al. | 356/345 |
| 4,931,771 | 6/1990 | Kahn | 340/556 |
| 5,206,923 | 4/1993 | Karlsson | 385/12 |

*Primary Examiner*—Richard E. Chilcot, Jr.
*Assistant Examiner*—Rafael Bacares
*Attorney, Agent, or Firm*—Jacobson, Price, Holman & Stern

[57] ABSTRACT

The present invention relates to a method for detecting external influence on an optical cable. The invention can be used as a sensor in an intrusion alarm, in which case the cable is buried and an alarm is triggered when someone treads on it. The invention can also be used as a surveillance system for an optical cable transmitting information. The method means that coherent radiation for surveillance purposes is transmitted in multimode in an optical fibre. On the receiver side the surveillance radiation is then split into two beams, that are plane-polarized in two different directions. Then the amplitude and/or frequency content of each beam is detected. A signal which is a measure of their amplitude and/or frequency relation is formed from this. Finally an alarm function is initiated when the signal exceeds predetermined values in time and/or level.

14 Claims, 2 Drawing Sheets

METHOD FOR DETECTING EXTERNAL INFLUENCE ON AN OPTICAL CABLE

BACKGROUND OF THE INVENTION

The present invention relates to a method for detecting external influence on an optical cable. The invention can be used as a sensor in an intrusion alarm, in which case the cable is buried and an alarm is triggered when someone treads on it. The invention can also be used as a surveillance system for an optical cable transmitting information. The present and more and more accelerating computerization presupposes in order to be effective that the computers are directly connected to each other. The demand for transmission capacity and quality makes cables having optical fibres well suited as transmission medium. Concurrently with the increased demand for capasity the optical cables will dominate completely.

The demand on an optical fibre connection handling sensitive information will be, that some sort of security system is installed. As the only possible future communication medium is optical fibres, the security systems will also be optical. Optical fibres is a medium which itself has a very great resistance against information tapping. It is very difficult to tap information from an optical fibre, but it is not impossible.

Today there exist some systems for discovering unauthorized influence on an optical fibre, all of which are based upon surveillance of the optical effect that is transmitted in the fibre core. The principle is in short that the external influence will lower the energy level in the fibre, at which an alarm is trigged. The method can be compared to an intensity modulated sensor, which is the least sensitive sensor type. The systems have considerable disadvantages and can not with an accaptable degree of security discover unauthorized dealing with the optical fibre or cable.

SUMMARY OF THE INVENTION

With great probability the next generation of security systems has to work according to a principle, that gives greater possibility to detect a manipulation of the optical fibre. Such a principle can be based upon the fact that every external influence on the fibre will modulate the phase of the light, which the receiver can detect. This is the sensor principle that gives the greatest sensitivity. The invention uses this system to solve the present problem by being designed in the way that is evident from the following claims.

DETAILED DESCRIPTION OF THE DRAWINGS

In the present invention the surveillance signal is transmitted in multimode in an optical fibre. It is then possible to use multimode fibres, which can be advantageous, as one then uses cables and a technique, that are well tested and frequent in the market. Further, already installed multimode connections can afterwards be supplemented with safety systems according to the invention, without changing the cables. By the word multimode fibre is in this application ment both gradient index fibres as well as step index fibres. In the case with a single-mode fibre for transmission of information the method according to the invention could still be used. The surveillance signal is then transmitted at a wavelength below the cut off wavelength of the single-mode fibre, which causes the surveillance radiation to propagate in several modes. The single-mode fibre will then act as a multimode fibre for this radiation.

Figure 1:
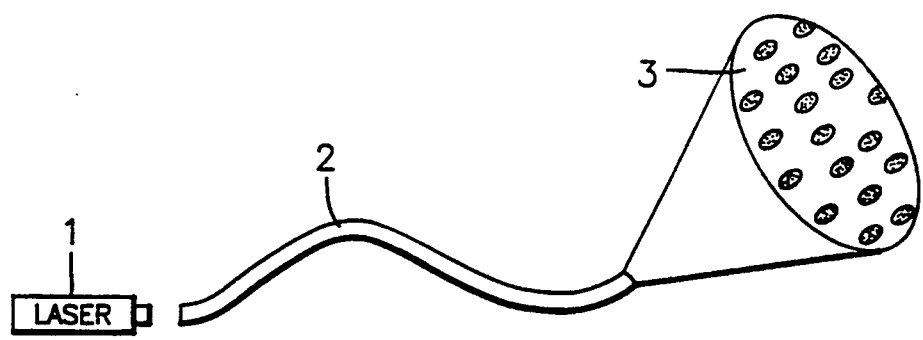
FIG. 1 shows a laser, an optical multimode fibre and the appearance of the interference pattern after the fibre.

In a multimode fibre there exists many directions of propagation due to the angle of incidence to the fibre that the incident "light rays" have. These directions of propagation are called modes. If coherent light, as in FIG. 1, from a laser 1 is transmitted in the fibre 2 and the emerging light illuminates for example a white paper, a pattern of interference 3 will appear on the paper. The pattern is caused by the constructive or destructive combination of the different modes of the multimode fibre. This pattern of interference is extremely sensitive to external influence on the fibre as the relative phase relation is changed by the influence, which in its turn causes a movement of the pattern of interference. If this movement can be detected a very accurate method to detect influence on the fibre is achieved. As a measure of the sensitivity in such a measuring method the smallest difference in wavelength caused by physical influence can be calculated, which gives a difference in distance of only $10^{-14}$ m. The coherence length for the light must be longer than the difference in distance between the highest and the lowest modes.

One method to detect this pattern is to place a photodiode for instance on an intensity maximum and watch the intensity variations. The disadvantage with this is that the pattern fades due to the random phase difference between emerging modes (the modes will not emerge uniformly). Below a method to solve the problem is given.

The phase relations can change due to changes in the spectral characteristics of the source of light caused by for instance modulation of the laser diode, by temperature variations of the source of light, by temperature variations along the optical fibre and by random distribution of the modes in the optical fibre, for instance caused by the concatination points. Such "benign" variations shall not trigger an alarm. Only the "malignant" variations that are due to tapping attempts shall trigger an alarm. It is, however, so that the "benign" variations have an uniform effect on the radiation in all directions of polarisation, which is not the case for the "malignant" variations.

Figure 2:
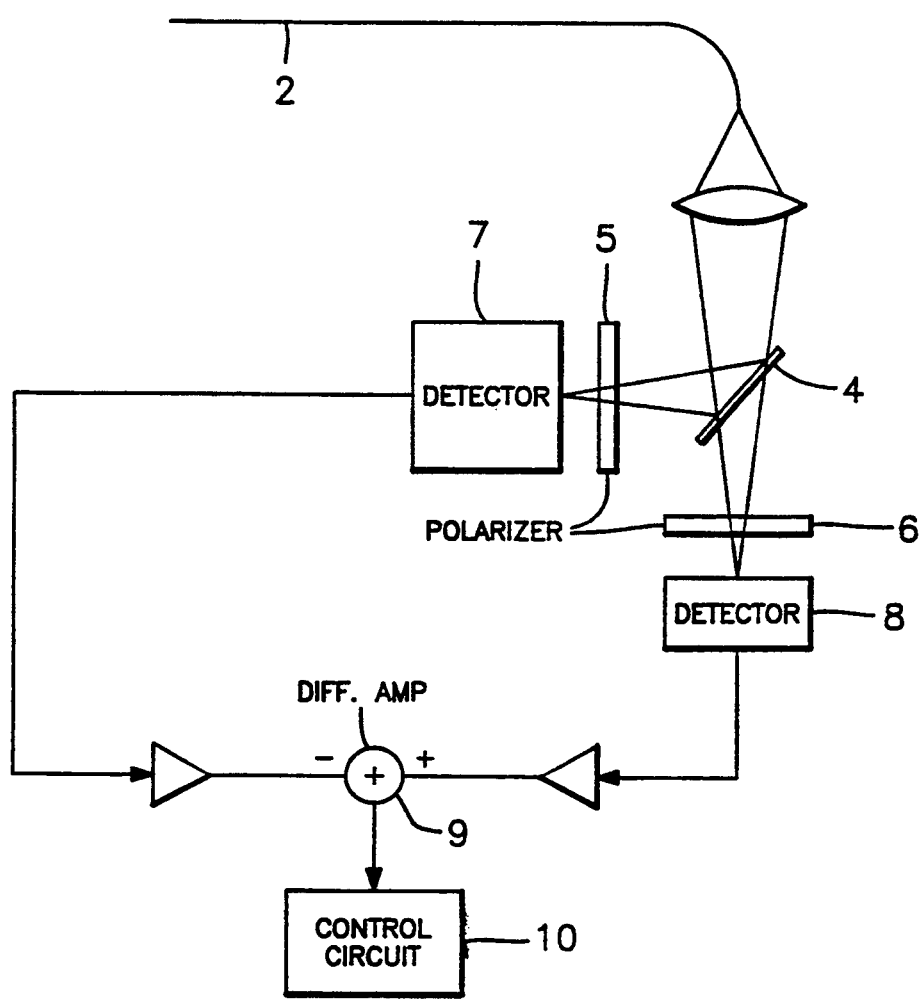
FIG. 2 shows an interference detector according to the invention.

The light emerging from the end of the fibre is therefore split by a beam splitter 4 into two beams, see FIG. 2. Each beam includes the entire interference pattern created by the transmission in the fibre. It is suitable to choose to split the beam into two beams that are on the whole equally strong, even though this is not necessary. The two beams are then plane-polarized in different directions by two polarizers 5 and 6. It is suitable to choose two directions that are essentially perpendicular to each other, even though this is not necessary. In a suitable embodiment of the invention the two emerging beams are then detected by detectors 7 and 8 independently from each other and the difference in amplitude is compared in at differential amplifier 9. The signal coming from the differential amplifier 9 is treated by control circuit 10 to decide if an alarm shall be generated. The decision about alarm is taken according to an alarm criterion determined in advance. The reason for the introduction of an alarm criterion is that the speckle pattern give rise to additional noise in the detector. This noise is due to the random variations over the detector area of the speckle pattern that give rise to a fluctuating electron current. The fluctuations consist of variations in the pattern itself as well as the mode filters of the transmission link such as for instance contacts and joints, which changes the phase position unevenly in the optical fibre and thereby causes intensity variations. Some fluctuation will then also be present in the calculated difference signal, although the direct intensity depending fluctuations cancel each other by the formation of the difference signal. The alarm criterion should be such that an alarm is only caused by cable touches which give rise to a variation in the speckle pattern that significantly exceeds the generated noise signal.

In stead of forming a difference signal it is possible to form other types of signals that are a measure of the touch. Thus it is possible to detect the difference in the quotient between the two signals or the variations in the frequency distribution between them.

A first embodiment of the invention, system A, means that a point to point connection consists of two fibres. One fibre is used to send data and the other for surveillance purposes. As the two fibres runs in the same cable, attempts to penetrate the cable will be detected by the sensor fibre. Should the unlikely happen that the cable is penetrated without this being detected, most probably an alarm will be generated when somebody tries to tap the information in the fibre. The reason is partly that there is a 50% chance of taking the wrong fibre and partly that the fibres are so close together that both fibres must be touched, which will result in an alarm. By installing several sensor systems in a cable having several fibres in such a way that the cable consists of a number of sensor fibres and one information fibre, the probability of detection can be increased further.

It is possibly most justified to use the system in multifibre cables having one sensor fibre and several information fibres. The cost for the security function is then divided upon the transmission chanels in the fibre cable. The fibre cable together with the transmission chanels being a part of it then becomes both very secure at the same time as one achieves a higher cost efficiency.

Figure 3:
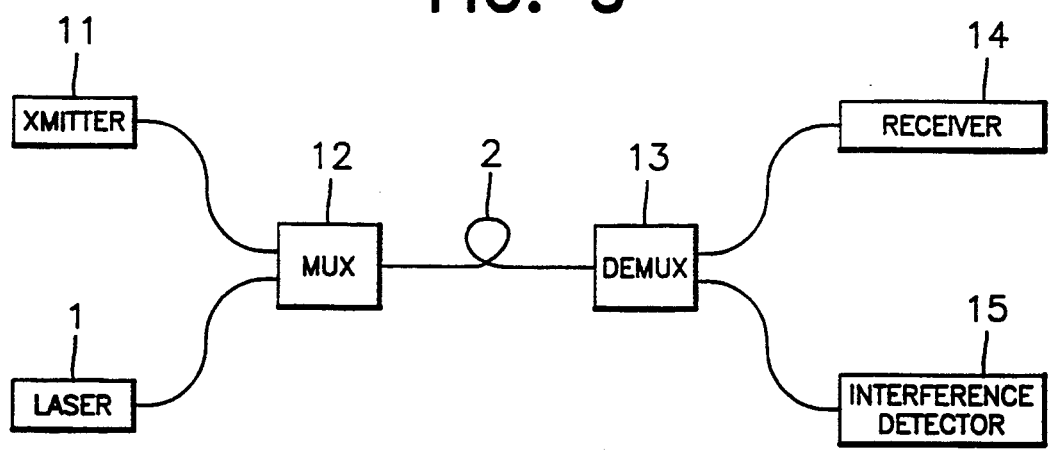
FIG. 3 shows a transmission system having the information signal and the surveillance signal wavelength multiplexed in one multimode fibre and FIG. 4 shows a transmission system, in which the information signal is caused to digitally modulate the surveillance signal.

In a second embodiment of the invention, system B, shown in FIG. 3, it is presumed, partly for security reasons, that one fibre is used per connection. The data sequence, that is to be transmitted, is transmitted by a transmitter 11 at one wavelength and the surveillance signal is transmitted by its transmitter 1 at another wavelength. Here as in system A the data sequence can be either analogously or digitally coded. The signals are wavelength multiplexed in a wavelength multiplexor 12 and are devided in a demultiplexor 13. The system thus transmits data and a surveillance signal in the same fibre. Data are detected in the receiver 14 and the surveillance signal in the interference detector 15 according to FIG. 2. This means that every attempt to tap will most probably be detected by the interference detector 15 and generate an alarm. If the most unlikely should occure, that is that someone is able to peel the fibre cable undetected, an alarm will be generated when the optical fibre 2 is exposed to tapping attempts. When data are not transmitted the interference detector 15 will still be active and generate an alarm at tapping attempts. Steps associated with feed-back of data and a requirement always to send data are completely unnecessary with this system, which is a great advantage.

Figure 4:
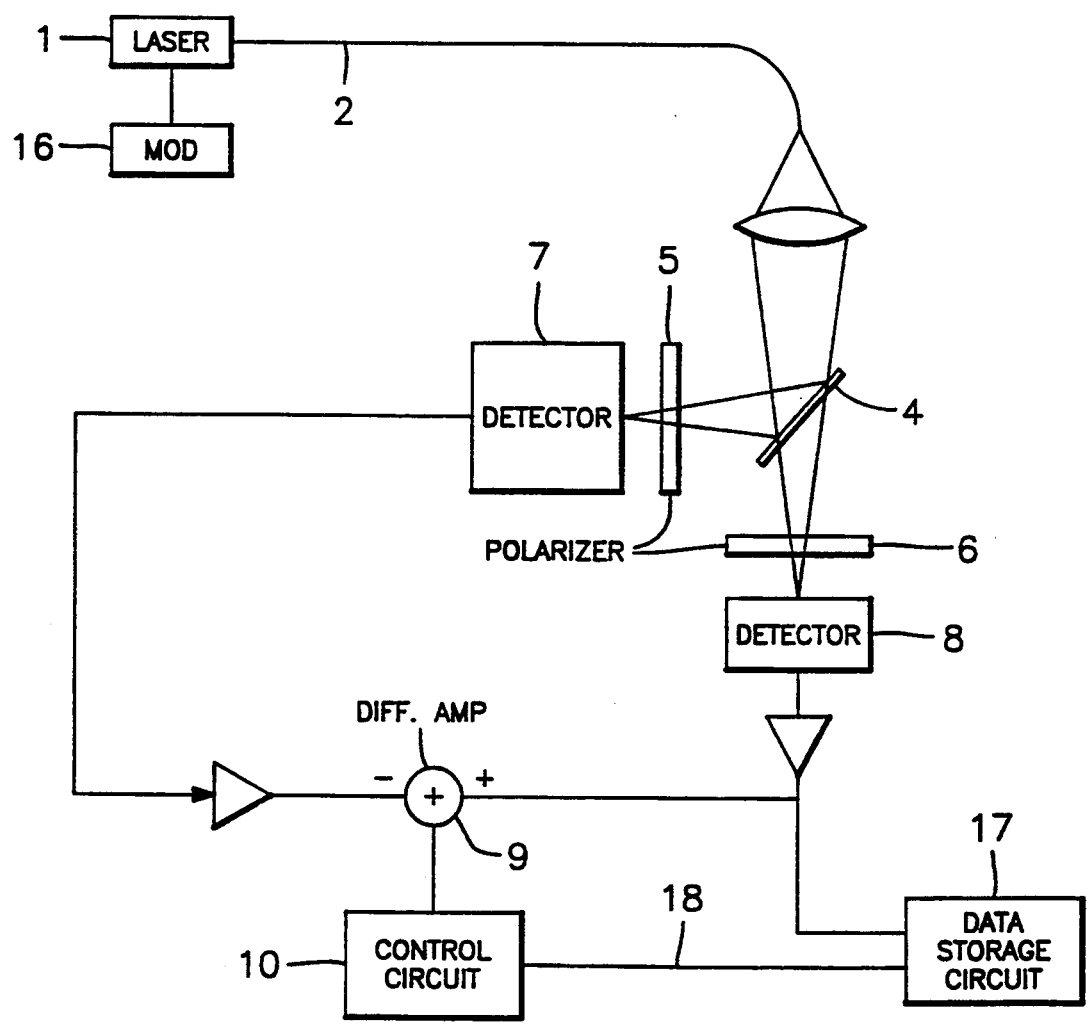

Further it is possible to imagine a variant of system B, called system C shown in FIG. 4, in which the ambition is to minimize the components in order to reduce the system costs. Here the security function laser 1 is modulated, with the help of modulator 16, with the data sequence that is to be transmitted. The sequence is in this case digitally coded. The system means that the special transmitter 11 and receiver 14 of system B, only meant for data transmission, is eliminated. The interference detector 15 on the other hand becomes more complicated as in addition there must be a data storage circuit 17 for the retrieval of data. As the laser 1 is digitally modulated the interference pattern may be changed in the flanks between the data bits, which means that an alarm could be triggered. Therefore the alarm decision must be blocked in the flanks between the data bits that are being transmitted. This is done by a signal 18 from the circuit 17 controlling a blocking of the alarm circuit 10.

Thus the gain with the system C is economic. The components that are saved are one transmitter diod, two wavelength multiplexors and one receiver. The additional components are electric and in this connection cheap.

When data is not transmitted, the laser must, as in system B, be active with the purpose of detecting tapping attempts during the time the information system is not active.

When data is transmitted the alarm will be disconnected in the flanks of the databits. This will not mean a weakness in the system, as the time the alarm is disconnected is a fraction of the inversion of the data rate of the system. This time will be some nano seconds and it is completely impossible to carry out a tapping during such a short time.

I claim:

1. A method for detecting external influence on an optical fiber in an optical cable, the method comprising the steps of:

transmitting coherent radiation for surveillance purposes in multimode through the optical fiber;

receiving the coherent radiation on a receiver end of the optical cable;

splitting the received radiation into two beams, each beam including an entire interference pattern created by the transmission in the fiber;

plane-polarizing the two beams in two different directions;

detecting amplitude of each beam and generating measurement signals respectively representative thereof;

comparing the measurement signals of each beam to generate an output signal representing the relationship therebetween; and triggering an alarm when the output signal exceeds a predetermined threshold.

2. A method according to claim 1, wherein the step of splitting comprises splitting the radiation into two beams of substantially the same intensity.

3. A method according to claim 1, wherein the step of plane-polarizing comprises polarizing the beams in two substantially perpendicular directions.

4. A method according to claim 1, wherein the step of transmitting comprises transmitting radiation in the cable in one or more optical fibres.

5. A method according to claim 4, wherein separate optical fibres in the cable are used for the transmission of information and surveillance purposes.

6. A method according to claim 4, wherein one optical fibre in the cable is used for surveillance purposes and several for transmission of information.

7. A method according to claim 4, wherein one and the same optical fibre is used for the transmission of information as well as for surveillance purposes, the signals being transmitted at different wavelengths and wavelength multiplexed, and subsequently divided at the receiver end and detected independently.

8. A method according to claim 4, wherein an optical multimode fibre is used, through which the surveillance signal is transmitted digitally modulated by the information signal and that on the receiver end the information signal is recreated from an electrical signal from the detector corresponding to one plane-polarized beam.

9. A method according to claim 1, wherein the step of comparing comprises determining and comparing the quotient between the measurement signals associated with each beam.

10. The method of claim 1, wherein the step of comparing comprises comparing differences in the amplitudes of each beam.

11. The method of claim 1, wherein the step of comparing comprises comparing differences in the frequency distribution of each beam.

12. A method for detecting external influence on an optical fiber in an optical cable, the method comprising the steps of:

transmitting coherent radiation for surveillance purposes in multimode through the optical fiber;

receiving the coherent radiation on a receiver end of the optical cable;

splitting the received radiation into two beams, each beam including an entire interference pattern created by the transmission in the fiber;

plane-polarizing the two beams in two different directions;

detecting a frequency distribution of each beam and generating measurement signals respectively representative thereof;

comparing the measurement signals of each beam to generate an output signal representing the relationship therebetween; and triggering an alarm when the output signal exceeds a predetermined threshold.

13. A method for detecting external influence on an optical fiber in an optical cable, the method comprising the steps of:

transmitting coherent radiation for surveillance purposes in multimode through the optical fiber;

receiving the coherent radiation on a receiver end of the optical cable;

splitting the received radiation into two beams, each beam including an entire interference pattern created by the transmission in the fiber;

plane-polarizing the two beams in two different directions;

detecting a frequency distribution of each beam and amplitude of each, and generating frequency distribution measurement signals and amplitude measurement signals, respectively representative thereof;

comparing the frequency distribution measurement signals of each beam and amplitude measurement signals of each beam to generate output signals representing the relationships therebetween; and triggering an alarm when the output signals exceed a predetermined threshold.

14. The method of claim 13, wherein the step of comparing further comprises the step of comparing differences in the amplitude measurement signals of each beam and comparing differences in the frequency distribution measurement signals of each beam.

* * * * *